Patented Oct. 27, 1953

2,657,219

UNITED STATES PATENT OFFICE

2,657,219
VITAMIN A ACETALS

Otto Isler and Nathan Chadwick Hindley, Basel, and Paul Zeller, Neu-Allschwil, Switzerland, assignors to Hoffmann-La Roche Inc., Nutley, N. J., a corporation of New Jersey No Drawing. Application January 28, 1950, Serial No. 141,158. In Switzerland May 11, 1949

6 Claims. (Cl. 260—345.9)

This invention relates to pentaenes.

The synthetic preparation of vitamin A (axerophthyl), vitamin A ethers and vitamin A esters is known (cf. "Experientia," vol. 2, year 1946, page 31; "Festschrift Emil Barell," Basle, 1946, page 31; "Helvetica Chimica Acta," vol. 30, year 1947, page 1911, and vol. 32, year 1949, page 489).

The present invention comprises new pentaenes namely acetals of vitamin A.

The present invention also includes a process for the manufacture of vitamin A acetals which comprises condensing an acetal of 1-hydroxy-3-methyl-pentene-(2)-yne-(4), by means of a Grignard reaction, with 4-(2',6',6'-trimethyl-cyclohexene-(1')-yl)-2-methyl-butene-(2)-al-(1) and subjecting the acetal of 1-hydroxy-3,7-dimethyl-6-hydroxy-9-(2',6',6'-trimethyl-cyclohexene-(1')-yl)-nonadiene-(2,7)-yne-(4) obtained, in any desired sequence, to partial hydrogenation of the triple bond by the addition of one mol of hydrogen, and to allyl re-arrangement and dehydration. This synthesis of the new vitamin A derivatives which follows the same principles as the known synthesis for vitamin A ethers is illustrated by the following reaction scheme:

The acetals (II), which are condensed with the known 4-(2',6',6'-trimethyl-cyclohexene-(1')-yl)-2-methyl-butene-(2)-al-(1), may be prepared by acetalising 1-hydroxy-3-methyl-pentene-(2)-yne-(4) in a manner known per se. The synthesis of the said acetals may also be effected by acetalising ketobutanol (VII) to ketobutanol-acetal (VIII), adding acetylene to obtain acetylene-carbinol (IX), and dehydrating the latter compound; this process is illustrated by the following reaction scheme:

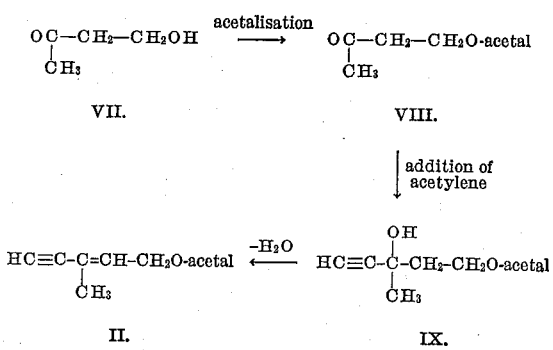

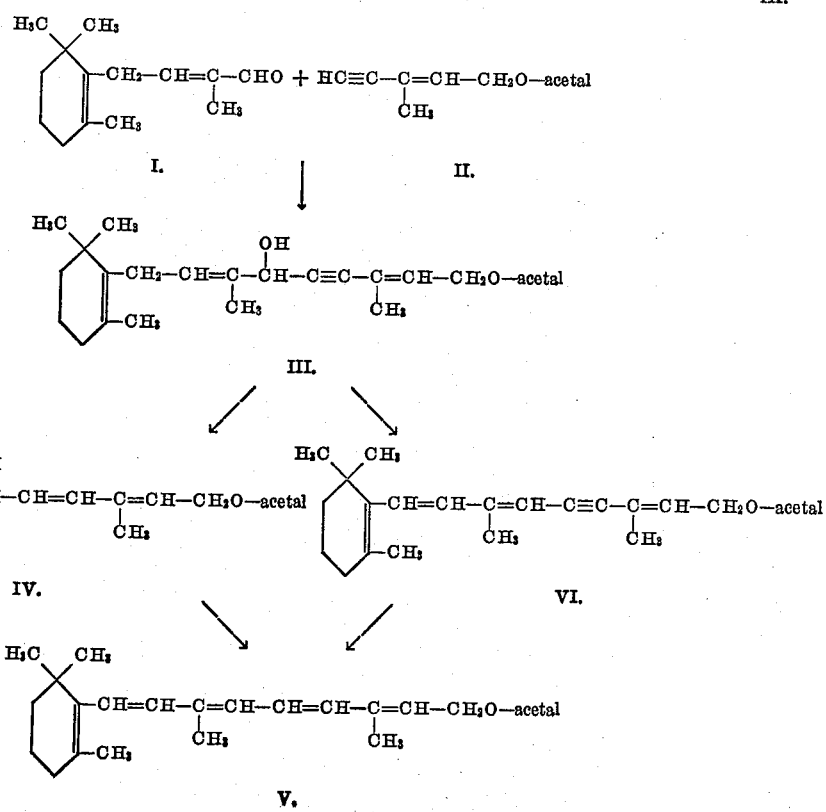

Aldehyde-acetals of 1-hydroxy-3-methyl-pentene-(2)-yne-(4) of Formula X

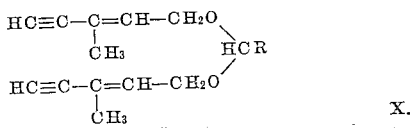

Aldehyde-acetal of 1-hydroxy-3-methyl-pentene-(2)-yne-(4)

wherein R represents a hydrocarbon radical, may, for example, be used for the condensation. They may be obtained by allowing a mixture of one mol of an aldehyde with 2 mols of 1-hydroxy-3-methyl-pentene-(2)-yne-(4) to stand for 24 hours at room temperature over pulverised calcium chloride. Thus, the acetal of Formula X, wherein R is methyl, of boiling point 133° C./12 mm.Hg, is obtained from acetaldehyde and 1-hydroxy-3-methyl-pentene-(2)-yne-(4).

Equally, keto-acetals of Formula XI, wherein R' and R'' are hydrocarbon radicals, may be employed for the condensation:

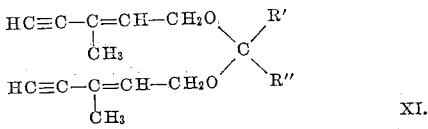

Keto-acetal of 1-hydroxy-3-methyl-pentene-(2)-yne-(4)

The keto-acetal (XI), wherein R' and R'' are methyl groups, will, for example, be formed by the action of a small quantity of anhydrous hydrochloric acid on a solution of 1-hydroxy-3-methyl-pentene-(2)-yne-(4) in acetone, in the presence of ortho-formic acid ethyl ester. The boiling point of the keto-acetal is 120–126° C./12 mm. Hg.

It may be especially advantageous to use masked acetals of 1-hydroxy-3-methyl-pentene-(2)-yne-(4) for the condensation. The tetrahydropyranyl ether of 1-hydroxy-3-methyl-pentene-(2)-yne-(4) of Formula XII is an example of such a compound.

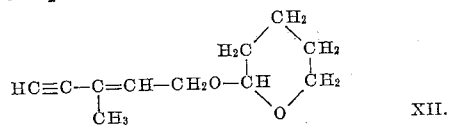

Tetrahydropyranyl ether of 1-hydroxy-3-methyl-pentene-(2)-yne-(4)

This compound may be obtained from 1-hydroxy-3-methyl-pentene-(2)-yne-(4) and dihydropyran with a little hydrogen chloride as catalyst, and the yield is nearly quantitative. Its boiling point is 60–61° C./0.1 mm. Hg.

The first reaction step of the process of the present invention is a Grignard reaction during which the active hydrogen atom at the acetylene bond of the acetal (II) first reacts with one equivalent of the alkyl magnesium halide, for example, an alkyl magnesium bromide. The magnesium compound formed is now condensed in a manner known per se with 4-(2',6',6'-trimethyl-cyclohexene-(1')-yl)-2-methyl-butene-(2)-al-(1) of Formula I. The reaction may be effected in the usual solvents, such as ethyl ether and anisole. The reaction product is hydrolysed in non-acid medium, preferably with the aid of an ammonium salt solution. The acetals of 1-hydroxy-3,7-dimethyl-6-hydroxy-9-(2',6',6'-trimethyl-cyclohexene-(1')-yl)-nonadiene-(2,7)-yne-(4) formed and corresponding to the general Formula III may be purified by chromatography, by separation between different solvents or by distillation in vacuo. They are highly viscous, yellowish oils which hitherto could not be obtained in crystallised form and which show maxima of absorption in the ultra-violet spectrum at about 230 m$\mu$.

The condensation products (III), preferably after purification, are subjected to partial hydrogenation at the triple bond. Suitably, the addition of hydrogen will be effected by catalytic hydrogenation in the presence of palladium catalysts of low activity, such as, for example, palladium-charcoal, onto which quinoline has been adsorbed before use. The introduction of hydrogen is discontinued as soon as the calculated quantity of hydrogen has been absorbed. The hydrogenated products, i. e. acetals of 1-hydroxy-3,7-dimethyl-6-hydroxy-9-(2',6',6'-trimethyl-cyclohexene-(1')-yl)-nonatriene-(2,4,7), of the general Formula IV, need not be isolated and purified. They are viscous yellowish oils which in ultra-violet absorption spectrum do not show any absorption maximum above 240 m$\mu$.

The products IV of the partial hydrogenation are subsequently subjected to allyl re-arrangement and dehydration. During this reaction step the hydroxyl group migrates from the 6-position to the 8-position and may be substituted at the same time, and the adjacent double bond migrates to the 6-position. Then, one mol of water or acid, respectively, is split off, whereby a new double bond is formed. Rearrangement and dehydration may be effected in a single operation by boiling with a small quantity of iodine in an inert solvent, such as petroleum ether of boiling range 80–110° C. Compounds from which iodine may easily be split off, such as phosphorus di-iodide or chlorine iodide, may be employed instead of iodine itself. The allyl re-arrangement and dehydration will also occur if compound IV is heated in an inert solvent to about 120° C. in the presence of a small quantity of a strong organic carboxylic acid, such as malonic acid or phthalic acid. It is especially advantageous to effect the allyl-rearrangement and dehydration by boiling in toluene solution with an equivalent quantity of phosphorus-oxychloride in the presence of excess pyridine.

Allyl re-arrangement and dehydration may also be effected prior to the partial hydrogenation of the triple bond. In this case the synthesis follows Formulae I, II, III, VI and V of the reaction scheme. The measures to be taken for each step are the same ones as in the sequence previously described.

The vitamin A acetals obtained in accordance with the present invention as described, when being purified, for example by chromatographic adsorption onto aluminum oxide columns, or separation between solvents, behave in the same way as do vitamin A ethers and vitamin A esters. Vitamin A acetals have the same biological activity as vitamin A and the esters thereof. They show a maximum of ultra-violet light absorption at 325–328 m$\mu$. The principal maximum of the Carr-Price reaction (antimony-trichloride in chloroform) is at 620 m$\mu$, and the secondary maximum at 580 m$\mu$. Vitamin A acetals are stable in alkaline media, whereas in acid media they are hydrolysed to vitamin A. The latter may, for example, be evidenced by adding 3n aqueous sulphuric acid to an alcoholic solution of an acetal until congo paper turns blue, adding water and isolating the vitamin A formed by means of ether. If desired, vitamin A can directly be obtained from the vitamin A acetals formed by dehydration, without prior isolation of the acetals, by working up the dehydration reaction mixture in an acid medium.

Vitamin A acetals may be split more easily than vitamin A ethers and, consequently, have full biological activity. The synthesis of vitamin A acetals presents certain advantages over the synthesis of vitamin A esters: During the Grignard reaction only one mol of alkyl magnesium halide is used per mol of 1-hydroxy-3-methyl-pentene-(2)-yne-(4); no partial esterification of the condensation product is required and the acetals obtained are stable in an alkaline medium.

*Example 1*

A solution of 10 parts by weight of acetaldehyde - bis - [3 - methyl - pentene - (2) - yne-(4)-yl-(1)] acetal (Formula X; R=CH₃) in 35 parts by volume of anisole is added, while vigorously stirring, in the course of 50 minutes to an ethyl-magnesium bromide solution, prepared from 2.5 parts by weight of magnesium, 13.7 parts by weight of ethyl bromide and 28 parts by volume of ether. The mixture is stirred for 2 hours at 40° C. in order to complete the reaction. Then 19 parts by weight of 4-(2',6',6'-trimethyl-cyclohexene - (1') - yl) - 2 - methyl - butene - (2) - al-(1) are added at 25–30° C. in the course of one hour. The mixture is stirred for 15 hours at room temperature, then poured onto ammonium acetate solution and ice and extracted with ether. The ethereal solution is washed with sodium carbonate solution, dried with potassium carbonate and boiled down. About 30 parts by weight of crude, yellow condensation products are thereby obtained and the same is purified by chromatographic adsorption onto a column consisting of 60 times the quantity of aluminum oxide by means of a percolation chromatogram. A first run obtained with petroleum ether is separated, and then the desired purified condensation product of $n_D^{22}=1.528$ and containing 2.01 mols of active hydrogen may be eluted with ether.

8.3 parts by weight of the acetal compound of 1,6 - dihydroxy - 3,7 - dimethyl - 9 - (2',6',6'-trimethyl - cyclohexene - (1') - yl) - nonadiene-(2,7)-yne-(4) thus obtained are hydrogenated in 25 parts by volume of petroleum ether of boiling range 80–105° C. after addition of 1.4 parts by weight of 5 percent palladium charcoal catalyst onto which 0.7 part by weight of quinoline were adsorbed prior to use. As soon as a little over 1 mol of hydrogen has been absorbed, the hydrogenation is discontinued and the catalyst is filtered off. The filtrate is boiled down and thereby the acetal compound of 1,6-dihydroxy - 3,7 - dimethyl - 9 - (2',6',6' - trimethyl-cyclohexene-(1')-yl)-nonatriene-(2,4,7) is obtained in practically quantitative yield. It is a light yellow viscous oil of $n_D^{20}=1.526$ and containing 2.05 mols of active hydrogen.

8 parts by weight of the said partially hydrogenated compound are dissolved in 8 parts by volume of pyridine and 20 parts by volume of toluene and this solution is added, while stirring under a nitrogen atmosphere, to a mixture of 2.6 parts by volume of phosphorus oxychloride, 8 parts by volume of pyridine and 10 parts by volume of toluene. The reaction temperature is kept at 95° C. for 45 minutes. After cooling, the mixture is poured onto sodium carbonate solution and ice and extracted with ether. The ethereal solution is washed with sodium carbonate solution, dried with potassium carbonate and boiled down. A yellow-red oil of $n_D^{20}=>1.60$ is obtained which is purified by a percolation chromatogram with petroleum ether onto 200 times its quantity of aluminum oxide. A small first run containing anhydro-vitamin A and a more difficultly elutable after-run, containing vitamin A alcohol, are separated. The desired vitamin A acetal compound which possesses adsorption capacities similar to those of vitamin A esters, is isolated as residue of the main middle run; if desired, it may be hydrolysed to vitamin A by treatment with an acid.

*Example 2*

A solution of 50.4 parts by weight of the tetrahydropyranyl ether of 1-hydroxy-3-methyl-pentene-(2)-yne-(4) in 100 parts by volume of anisole is poured into a boiling solution of ethyl magnesium bromide (prepared from 7.5 parts by weight of magnesium, 38 parts by weight of ethyl bromide and 75 parts by volume of ether) in the course of 30 minutes while stirring vigorously. In order to complete the reaction, the mixture is then stirred for 15 minutes at 35° C. and 30 minutes at 40° C., whereafter the evolution of gas ceases. Then 57.5 parts by weight of 4 - (2',6',6' - trimethyl - cyclohexene - (1') - yl) - 2 - methyl - butene - (2) - al - (1) are added at 25° C. in the course of 15 minutes. The mixture is stirred for 12 hours at room temperature, then poured onto 100 parts by weight of ice, hydrolysed with ammonium acetate solution and extracted with ether. After washing, drying and boiling down the ethereal anisole solution, about 100 parts by weight of crude yellow condensation product are obtained which is fractionated in high vacuum. The starting material which has not entered into reaction is separated as a first run. The desired tetrahydropyranyl ether of 1-hydroxy-3,7-dimethyl-6-hydroxy - 9 - (2',6',6' - trimethyl - cyclohexene-(1')-yl-nonadiene-(2,7)-yne-(4) under a pressure of 0.05 to 0.07 mm. Hg boils at 200–210° C; $n_D^{20}=1.524$.

30 parts by weight of the latter compound are hydrogenated in 75 parts by volume of petroleum ether of boiling point 80–105° C. in the presence of 6 parts by weight of 5 percent palladium charcoal catalyst onto which 3 parts by weight of quinoline were adsorbed before use. As soon as 1.05 mols of hydrogen have been taken up, the hydrogenation is discontinued and the catalyst is filtered off. By boiling down the filtrate, the tetrahydropyranyl ether of 1-hydroxy-3,7 - dimethyl - 6 - hydroxy - 9 - (2', 6', 6' - trimethyl - cyclohexene - (1') - yl) - nonatriene-(2,4,7) is obtained in quantitative yield. It is a light-yellow, highly viscous oil of $n_D^{20}=1.517$. The compound contains one active hydrogen atom and in the ultra-violet spectrum it does not show any maximum of absorption above 240 m$\mu$.

10 parts by weight of tetrahydropyranyl ether of 1-hydroxy-3,7-dimethyl-6-hydroxy-9-(2',6',6'-trimethyl - cyclohexene - (1') - yl) - nonatriene-(2,4,7) are dissolved in 20 parts by volume of toluene and then added, while stirring and introducing pure nitrogen, to a mixture of 3.2 parts by volume of phosphorus oxychloride, 30 parts by volume of pyridine and 20 parts by volume of toluene, during which operation the temperature is maintained for 45 minutes at 90–95° C. The reaction mixture is then cooled and poured onto sodium carbonate solution and ice whereupon the mixture is extracted with ether. The ethereal solution is successively washed with sodium carbonate solution and water, dried with potassium carbonate and then boiled down. The residue, a yellow oil, shows in the ultra-violet spectrum an absorption maximum at 325–330 mμ, and with antimony trichloride in chloroform a blue colour with a principal absorption maximum at 620 mμ and a secondary maximum at 580 mμ. In order to concentrate the tetrahydropyranyl ether, the mixture is purified by a percolation chromatogram with petroleum ether onto an aluminum oxide column, whereby a first run containing anhydrovitamin A and an after-run containing impurities having higher absorption capacity are separated. Pure tetrahydropyranyl ether of vitamin A is a viscous yellow oil of $n_D^{20}=1.6050$ with an absorption maximum in the ultra-violet spectrum at 327 mμ ε=50500.

(E 327 mμ/300 mμ=1.77.)

We claim:

1. A compound selected from the class consisting of those having the formulas

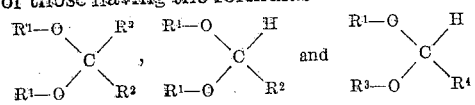

wherein $R^1$ represents an axerophthyl radical, $R^2$ represents a lower alkyl radical, and $R^3$ and $R^4$ together represent a tetramethylene radical.

2. As a new compound axerophthyl-2-tetrahydropyranyl ether having the formula

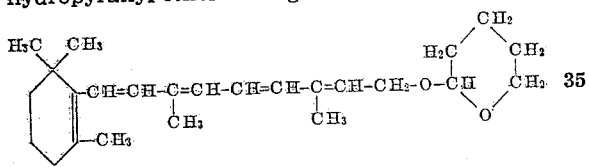

3. As a new compound diaxerophthyl acetaldehyde acetal having the formula

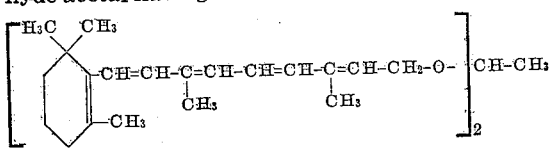

4. A process of preparing a compound selected from the class consisting of those having the formulas

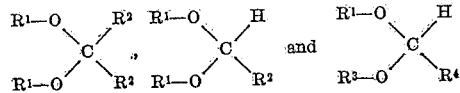

wherein $R^1$ represents an axerophthyl radical, $R^2$ represents a lower alkyl radical, and $R^3$ and $R^4$ together represent a tetramethylene radical, which comprises heating with phosphorus oxychloride and pyridine in an inert organic solvent a compound selected from the class consisting of those having the formulas

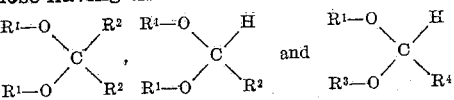

wherein $R^1$ represents a [3,7-dimethyl-6-hydroxy - 9 -(2',6',6'- trimethyl-cyclohexene -(1')-yl) -nonatriene-(2,4,7) -yl-(1) ] radical, $R^2$ represents a lower alkyl radical, and $R^3$ and $R^4$ together represent a tetramethylene radical.

5. A process of making axerophthyl 2-tetrahydropyranyl ether which comprises heating [3,7-dimethyl-6-hydroxy-9-(2',6',6'-trimethyl - cyclohexene -(1')- yl)- nonatriene -(2,4,7)- yl -(1)] 2-tetrahydropyranyl ether with phosphorus oxychloride and pyridine in an inert organic solvent.

6. A process of making diaxerophthyl acetaldehyde acetal which comprises heating di-[3,7-dimethyl-6-hydroxy - 9 -(2',6',6'-trimethylcyclohexene -(1')- yl)- nonatriene -(2,4,7)- yl -(1)] acetaldehyde acetal with phosphorus oxychloride and pyridine in an inert organic solvent.

OTTO ISLER.
NATHAN CHADWICK HINDLEY.
PAUL ZELLER.

References Cited in the file of this patent

UNITED STATES PATENTS

| Number | Name | Date |
|---|---|---|
| 2,412,465 | Milas | Dec. 10, 1946 |
| 2,451,736 | Isler | Oct. 19, 1948 |
| 2,451,739 | Isler | Oct. 19, 1948 |
| 2,451,741 | Huber | Oct. 19, 1948 |
| 2,452,386 | Milas | Oct. 26, 1948 |
| 2,475,139 | Isler | July 5, 1949 |
| 2,516,679 | Copenhaver | July 25, 1950 |
| 2,540,118 | Isler | Feb. 6, 1951 |

OTHER REFERENCES

Heilbron: Jour. Am. Chem. Soc., March 1948, p. 393.